June 16, 1959 D. E. EISENBERG 2,891,236

ELECTROMAGNETIC TRANSDUCER

Filed May 25, 1953

INVENTOR
DANIEL E. EISENBERG
BY
Lawrence R. Brown
ATTORNEY 2,891,236
Patented June 16, 1959

2,891,236

ELECTROMAGNETIC TRANSDUCER

Daniel E. Eisenberg, Philadelphia, Pa., assignor to Burroughs Corporation, Detroit, Mich., a corporation of Michigan Application May 25, 1953, Serial No. 357,173

13 Claims. (Cl. 340—174)

This invention relates to electromagnetic transducers and more particularly it relates to combined writing and reading heads adapted for recording and reproducing discrete binary digital information on a permanent or semi-permanent storage medium.

Magnetic recording systems for digital data storage are well known in the art. Magnetic transducers proposed in such and similar systems are adapted to read information from a recorded track and also to write information on a track in two different polarities.

With conventional multi-purpose heads, however, engineering design compromises must be made to optimize operating conditions. Thus, for economy of magnetizing current in the writing coils, these should be constructed of many turns of wire. Also, transducer efficiency may be improved with high merit factor (Q) core materials such as ferrites. However, placing many turns of wire on a high merit factor core results in excessive ringing in the writing coils unless these are suitably damped by appropriate networks. Such damping networks, however, seriously affect the head efficiency in writing and even contribute to a loss in signal in the process of reading. These factors and opposing effects generally restrict the design parameters of prior art multi-purpose heads within close limits.

In accordance with the present invention, however, a multi-purpose transducer head is provided having separate magnetic paths for two writing windings and a common transducing structure for the two windings. In this manner, optimum damping may be utilized to improve the writing efficiency. In addition, improvement in reading efficiency results. With such heads writing current is reduced for the same magnitude of recorded signal, since the number of turns in the writing windings may be greatly increased. With such construction the interdependence of design factors is reduced so that different design parameters may be optimized separately. Thus, the range of possible design is extended and extreme circuit limitations need no longer be imposed.

It is, therefore, a general object of the invention to provide improved multi-purpose magnetic transducers.

Another object of the invention is to provide magnetic transducers capable of writing signals of two opposite polarities with little writing current.

Further it is an object of the invention to increase the reading efficiency of multi-purpose magnetic transducers.

A still further object of the invention is to provide a large range of possible design parameters in systems utilizing magnetic read-write transducers.

Other objects and features of advantage will be found throughout the following more detailed description of the invention and its organization. The description is made with reference to the accompanying drawing, in which.

Figure 1:
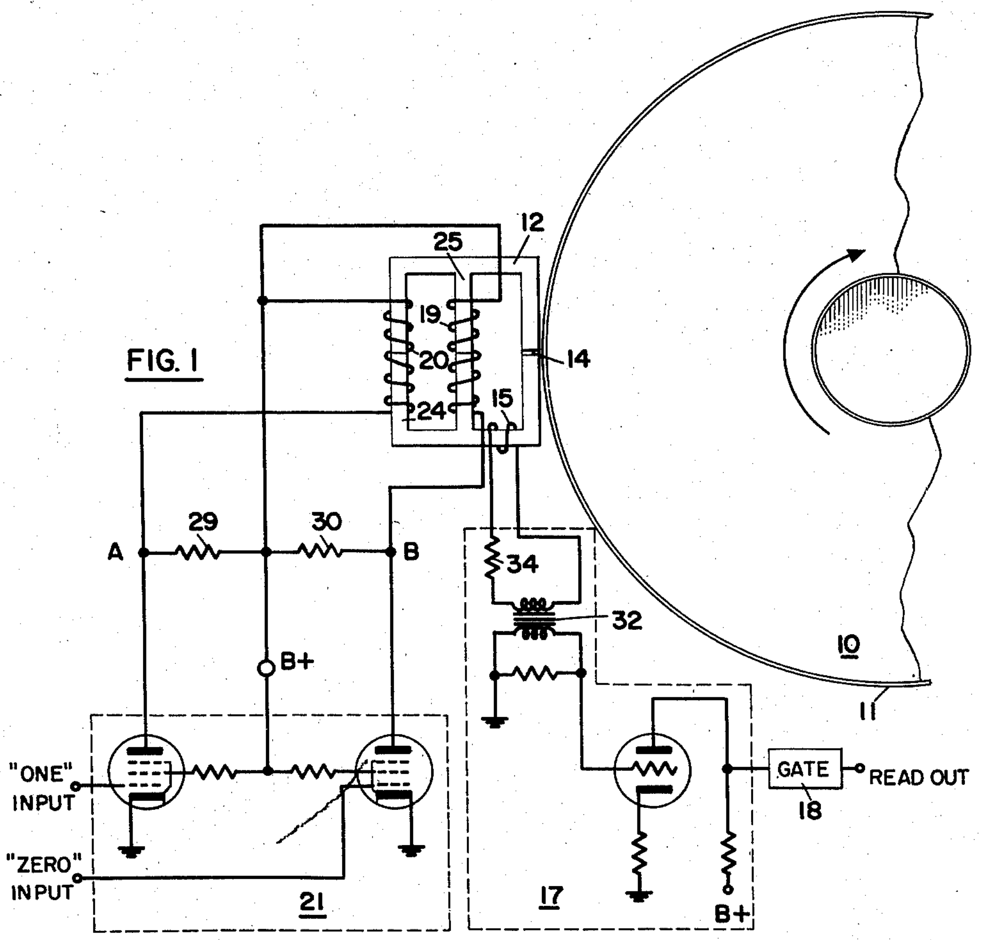
Fig. 1 is a diagrammatic view of a magnetic drum storage system embodying the invention.

The recording system shown in Fig. 1 includes a rotatable magnetic drum 10 having a ferromagnetic coating 11 adapted for storage of signals produced by fringing flux in the transducing gap 14 of the magnetic transducer 12. The transducer 12 is a multi-purpose head adapted both to read signals upon the magnetic drum by way of read winding 15 and associated read-out circuit 17, and to write signals of two opposite polarities by way of the writing windings 19 and 20 and associated writing circuit 21. In general, the read-out circuit is disabled during read-in operations by a gating circuit 18 actuated by a suitable programming circuit. The writing circuit is actuated by suitable pulse sources (not shown) so that discrete digital data of different polarities is recorded upon the drum surface 11. It is to be understood that the writing and reading circuits are only illustrative, and may be replaced by any other suitable circuitry without departing from the present invention. In general, opposite recorded polarities are produced by current flowing in the writing windings 19 and 20 respectively. In accordance with the present invention separate parallel magnetic paths 24 and 25 are provided for the respective writing windings 19 and 20.

When high-Q materials are used for the transducer core material, there is a tendency for the transducer to produce ringing transients rather than provide discrete output pulses. This effect becomes more noticeable as the number of turns in the write windings is increased because of increased inductance and distributed capacity. It is, however, desirable to provide a large number of writing turns in order to decrease the required exciting current.

With prior art heads where both writing windings are wound about a single magnetic path, damping resistors across the writing windings have reduced writing efficiency since a relatively low impedance current path is presented by the damping resistors. When one writing winding is excited, the current induced in the other winding produces an opposition flux to the flux produced by the exciting pulse, as explained by Lenz's law. With series-connected writing windings this effect attenuates the desired signal and therefore prevents the desired writing flux from being developed at the transducing gap. In the present transducer, however, the parallel magnetic writing paths serve to cause substantially the entire writing current to be effective in producing flux at the gap and therefore in recording information upon the magnetic drum surface. In fact an increase in the number of turns in the writing windings, or a decrease in the size of the damping resistor, within limits, will serve to improve the writing efficiency by repelling flux from the shunt circuit through the transducing gap.

Reading efficiency is also improved with the present transducer. Since the damping resistors are not switched out during reading operations, the current flow produces attentuation of reading signals as produced in the read-out winding 15. This occurs in the present head as well as prior art heads having series connected windings. However, the attenuation provided by parallel connected windings of the present invention is much smaller than that developed by the series connected windings of the prior art. Therefore, for the same operating conditions, the parallel magnetic paths serve to provide increased read-out efficiency.

Figure 2:
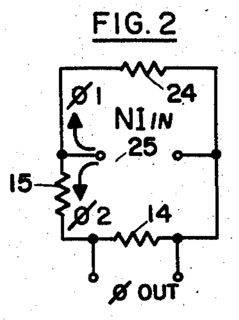
Figs. 2 and 3 are respectively equivalent circuit diagrams of the transducer during writing and reading operations.
Figure 3:
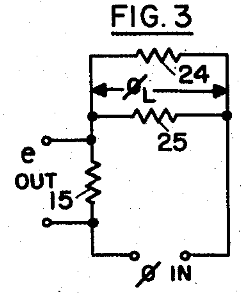

The equivalent circuit diagrams of Figs. 2 and 3 respectively indicate conditions during writing and reading. Those features pertinent to the design of transducers operating in accordance with the present invention are therefore clearly presented, During the writing operation, conditions are equivalent to those illustrated in Fig. 2. The input signal is introduced in one of the writing windings, say in the branch path 25. In this case, it is desirable to produce as much output flux as possible across the gap 14 which presents considerable reluctance to the magnetic signal. Some reluctance is also afforded by the read-out winding 15. It is, therefore, desired that the alternative path 24 presents such a large reluctance that the amount of flux $\phi_1$ in this path is as small as possible as compared with the flux $\phi_2$ in the transducing gap 14. As hereinbefore described, it is readily seen that the reluctance of the path 24 may be made very large by increasing the turns and lowering the value of the damping resistor shunting the winding. Accordingly the writing efficiency becomes higher. With write windings in series, on the other hand, the available output flux signal is greatly diminished under the same conditions. The number of turns in the two writing windings as well as the values of the damping resistors associated therewith are generally matched.

The reading operation indicated in Fig. 3 provides an input flux in the transducing gap 14. It is desirable to winding 15. The writing windings in the magnetic paths 24 and 25 cause a combined resultant reluctance to be presented to the flux. The read-out winding itself causes a certain amount of additional magnetic reluctance to the signal flux. The overall effect is that of a flux divider. It is desirable to provide the least amount of reluctance in the writing windings to afford a minimum attentuation ($\phi_L$) to the reading flux induced in the transducer gap. By paralleling the magnetic paths 24 and 25 for the respective writing windings the reading signal loss may be readily decreased even when a large number of turns on the record windings might otherwise cause relatively high reluctance to be presented by the writing circuits. It is, therefore, apparent that the present invention provides an improved multi-purpose transducer capable of efficiently recording and reproducing magnetic signals.

It is to be recognized that the design of magnetic heads varies greatly in accordance with desired operating circuits and recording media. It has been found, however, that good results have been obtained in accordance with those operating parameters described hereinafter.

Figure 4:
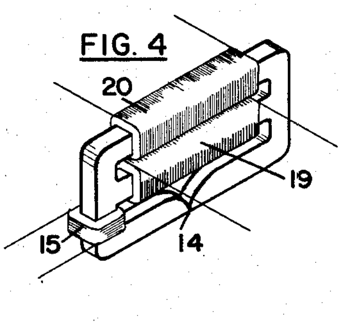
Fig. 4 is a perspective view of a magnetic transducer embodiment constructed in accordance with the teachings of this invention.

Referring to the circuit diagram of Fig. 1, the damping resistors 29 and 30 are 4.3KΩ, and each of the writing windings 19 and 20 were provided with 200 turns. The core of the transducer was constructed of Ferroxcube ferrite number 101 and dimensioned as shown in Fig. 4 with a .001" gap including a silver shim. The read-out winding 15 included 25 turns and was coupled to the 50:1 step up transformer 32 by a series resistor 34 of 4.7Ω for R–L differentiation. A drum speed of 1600" per second and a pulse repetition rate of 125 kilocycles per second with a .001" spacing of the transducer gap from a ferric oxide coating on the drum were utilized to produce the following data, which indicates the magnitudes of writing current in milliamperes necessary for corresponding read back potential in millivolts across the secondary of the transformer.

| Writing Current (milliamperes) | Read Back Amplitude (millivolts) |
|---|---|
| 50 | 75 |
| 75 | 100 |
| 100 | 175 |
| 125 | 300 |
| 150 | 350 |
| 175 | 475 |
| 200 | 500 |

Having therefore described the invention and its mode of construction, it is desired that Letters Patent be granted for the subject matter believed descriptive of the nature of the invention and defined with particularity in the following claims.

I claim:

1. A gap type electromagnetic transducer comprising a magnetic core having a plurality of commonly connected parallel magnetic paths, two windings connected for respectively recording signals of opposite polarities and each magnetically coupled to said core for exciting a magnetizing force in a separate one of said magnetic paths, a damping circuit coupled to each of said windings, and a transducing gap situated in a third of said magnetic paths.

2. A transducer as defined in claim 1 wherein an additional winding connected for reading signals from a magnetic record is provided about said third magnetic path.

3. In a transducer for recording signals of two opposite polarities, first means for recording signals of one polarity, second means for recording signals of the opposite polarity, magnetic transducing means in said transducer, and magnetic core means providing parallel magnetic paths from both said first and second means to said magnetic transducing means.

4. A recording and reproducing transducer comprising, in combination, a ferromagnetic body, three parallel magnetic paths in said body, a winding about each of said paths, a transducing gap in one of said paths, and the windings about the other two paths connected to produce signals of opposed polarities, respectively.

5. An electromagnetic recording system comprising, in combination, a magnetic record body, a ferromagnetic transducer adapted to record signals along a lane in said body, three parallel magnetic paths in said transducer each having a winding thereabout, transducing means in one magnetic path, a reading circuit coupled to the winding in the last mentioned magnetic path, a writing circuit coupled to produce magnetic flux of opposite polarities from the respective windings in the other two magnetic paths, and a damping circuit connected with each of said writing windings.

6. A system as defined in claim 5 wherein the record body comprises a rotatable magnetic drum spaced from the transducing means.

7. A system as defined in claim 6 wherein the writing circuit includes pulse sources so connected as to record discrete digital data upon the record surface.

8. A system as defined in claim 5 wherein the ferromagnetic transducer comprises a ferrite core.

9. A system as defined in claim 5 wherein the transducing means is a gap in said magnetic path.

10. A system for selectively recording signals of opposite polarities with a single magnetic transducer having a pair of opposed damped recording windings for the respective signals comprising separate flux paths in the transducer for signals applied to each of said windings, and common transducing means for producing flux from each winding in a desired magnetic record surface.

11. In a system for recording opposite polarity signals with a single transducer, means for exciting the respective signals in separate parallel branches of the transducer, and magnetic writing means in a common branch of the transducer in parallel with said separate branches for reproducing the signals.

12. A system for recording and reproducing discrete binary digital pulses at high pulse repetition rates on a magnetic storage medium comprising in combination, a magnetic head of high Q core material having a flux path including a transducing gap and two multi-turn writing windings for respectively recording signals of opposite polarities, damping resistors coupled in shunt with the two writing windings of sufficiently low ohmic resistance to dampen ringing in the writing circuits in response to actuation by said pulses because of said high Q magnetic head whereby transient current flow occurs in the writing windings and damping resistors in response to changes of magnetic flux in said head, said head having a configuration providing two low reluctance magnetic flux paths, each connected in parallel with said path including the gap, with the separate writing windings about the two low reluctance paths, whereby the writing current flow in one of the writing windings causing flux changes in the head resulting in said transient current flow in the other of the writing windings to aid the flux changes produced by the said one writing winding to proceed across the transducing gap.

13. A recording system as defined in claim 12 wherein a reading winding is provided upon said magnetic head in the path including the gap to thereby produce reading signals upon a change in flux at the gap which are, because of the two low reluctance paths, reduced little by said transient current flow in the two parallel writing windings.

References Cited in the file of this patent

UNITED STATES PATENTS

| | | |
|---|---|---|
| 2,351,004 | Camras | June 13, 1944 |
| 2,452,529 | Snoek | Oct. 26, 1948 |
| 2,538,405 | Zenner | Jan. 16, 1951 |
| 2,540,654 | Cohen et al. | Feb. 6, 1951 |
| 2,700,148 | McGuigan et al. | Jan. 18, 1955 |
| 2,786,897 | Schwarz | Mar. 26, 1957 |

FOREIGN PATENTS

| | | |
|---|---|---|
| 877,208 | Germany | May 21, 1953 |